United States Patent
Kim et al.

(10) Patent No.: US 9,956,927 B2
(45) Date of Patent: *May 1, 2018

(54) MANUFACTURING METHOD OF HIGHLY HEAT-RESISTANT SOUND ABSORBING AND INSULATING MATERIALS

(71) Applicants: Hyundai Motor Company, Seoul (KR); Kia Motors Corporation, Seoul (KR)

(72) Inventors: Keun Young Kim, Gyeonggi-Do (KR); Jung Wook Lee, Gyeonggi-Do (KR); Won Jin Seo, Gyeonggi-Do (KR); Won Ku Lee, Gyeonggi-Do (KR); Su Nam Lee, Gyeonggi-Do (KR); Byung Cheol Cho, Gyeonggi-Do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days. days.

This patent is subject to a terminal disclaimer.

(21) Appl. No.: 14/441,144

(22) PCT Filed: Nov. 6, 2013

(86) PCT No.: PCT/KR2013/010027
§ 371 (c)(1),
(2) Date: May 6, 2015

(87) PCT Pub. No.: WO2014/073860
PCT Pub. Date: May 15, 2014

(65) Prior Publication Data
US 2015/0283960 A1  Oct. 8, 2015

(30) Foreign Application Priority Data
Nov. 6, 2012 (KR) .................. 10-2012-0124945

(51) Int. Cl.
*B60R 13/08* (2006.01)
*G10K 11/00* (2006.01)
(Continued)

(52) U.S. Cl.
CPC .......... *B60R 13/0815* (2013.01); *B32B 37/10* (2013.01); *B32B 37/24* (2013.01);
(Continued)

(58) Field of Classification Search
CPC ... B32B 2307/102; B32B 37/10; B32B 37/24; B60R 13/0815; B60R 13/083;
(Continued)

(56) References Cited

U.S. PATENT DOCUMENTS 4,522,876 A * 6/1985 Hiers ................... B32B 5/06
128/107.1
5,298,694 A * 3/1994 Thompson ............. B32B 5/02
181/286
(Continued)

FOREIGN PATENT DOCUMENTS

CN  1530659 A  9/2006
CN  1930789 A  6/2007
(Continued)

OTHER PUBLICATIONS

Suzuki KR20090117969 Translation.*
Lee KR20110035728 Translation.*
International Search Report Jan. 24, 2014 for PCT/KR2013/010027.

*Primary Examiner* — Jason L Vaughan
*Assistant Examiner* — Amanda Meneghini
(74) *Attorney, Agent, or Firm* — Mintz Levin Cohn Ferris Glovsky and Popeo, P.C.; Peter F. Corless

(57) ABSTRACT

The present invention relates to a method for manufacturing a highly heat-resistant sound absorbing and insulating material, more specifically to a method including a beating and (Continued)

mixing step, a web forming step, a web stacking step, a needle punching step, a binder impregnating step and a solvent recovering step.

The highly heat-resistant sound absorbing and insulating material manufactured by the method according to the present invention may be installed on a location closest to the noise source of an engine or an exhaust system to reduce radiated noise from the engine or the exhaust system, thereby improving quietness inside a vehicle, and may be applied to a location adjacent to a metal part which is at a temperature of 200° C. or greater to exert heat-insulating function, thereby protecting nearby plastic and rubber parts.

22 Claims, 7 Drawing Sheets

(51) Int. Cl.
| | |
|---|---|
| B32B 37/24 | (2006.01) |
| B32B 37/10 | (2006.01) |
| B32B 38/04 | (2006.01) |
| B32B 38/08 | (2006.01) |
| D04H 5/02 | (2012.01) |
| D04H 5/04 | (2006.01) |
| D04H 1/4326 | (2012.01) |
| D04H 1/4382 | (2012.01) |
| D04H 1/488 | (2012.01) |
| D04H 1/64 | (2012.01) |

(52) U.S. Cl.
CPC .............. *B32B 38/04* (2013.01); *B32B 38/08* (2013.01); *B60R 13/08* (2013.01); *B60R 13/083* (2013.01); *B60R 13/0838* (2013.01); *B60R 13/0861* (2013.01); *B60R 13/0876* (2013.01); *D04H 1/4326* (2013.01); *D04H 1/4382* (2013.01); *D04H 1/488* (2013.01); *D04H 1/64* (2013.01); *D04H 5/02* (2013.01); *D04H 5/04* (2013.01); *G10K 11/00* (2013.01); *B32B 2307/102* (2013.01); *B32B 2605/003* (2013.01); *D10B 2331/021* (2013.01); *D10B 2505/12* (2013.01)

(58) Field of Classification Search
CPC . B60R 13/08; B60R 13/0876; B60R 13/0861; B60R 13/0838; D04H 1/4382; D04H 1/64; D04H 1/4326; D04H 5/02; D04H 5/04
See application file for complete search history.

(56) References Cited

U.S. PATENT DOCUMENTS

| | | | |
|---|---|---|---|
| 6,583,072 B1* | 6/2003 | Kawakami | B01D 39/163 |
| | | | 442/103 |
| 2003/0096079 A1* | 5/2003 | Messina | B32B 27/40 |
| | | | 428/85 |
| 2004/0231915 A1 | 11/2004 | Thompson, Jr. et al. | |
| 2006/0225952 A1 | 10/2006 | Takayasu et al. | |
| 2008/0096451 A1 | 4/2008 | Haerle | |
| 2008/0236936 A1 | 10/2008 | Niwa et al. | |
| 2009/0246502 A1* | 10/2009 | Hoetzeldt | B32B 5/26 |
| | | | 428/304.4 |
| 2009/0272600 A1 | 11/2009 | Okabe et al. | |
| 2011/0186381 A1 | 8/2011 | Ogawa et al. | |
| 2014/0235131 A1 | 8/2014 | Yun et al. | |
| 2015/0259904 A1* | 9/2015 | Kim | D04H 1/4242 |
| | | | 181/294 |

FOREIGN PATENT DOCUMENTS

| | | | | |
|---|---|---|---|---|
| CN | 101040319 A | | 9/2007 | |
| CN | 101571066 A | | 11/2009 | |
| CN | 102089802 A | | 6/2011 | |
| EP | 102375 A1 | | 7/2000 | |
| EP | 2113642 A1 | | 11/2009 | |
| GB | 1180938 A | | 2/1970 | |
| JP | H07-85863 A | | 3/1995 | |
| JP | H11-158776 A | | 6/1999 | |
| JP | H11-297579 A | | 10/1999 | |
| JP | 2003-119657 A | | 4/2003 | |
| JP | 2003-313272 A | | 11/2003 | |
| JP | 2004-292253 | | 10/2004 | |
| JP | 2005-335279 A | | 12/2005 | |
| JP | 2006-071959 | | 3/2006 | |
| JP | 2007-175567 A | | 7/2007 | |
| JP | 2008-248866 A | | 10/2008 | |
| JP | 2009-167571 A | | 7/2009 | |
| JP | KR 20090117969 A | * | 11/2009 | ........... D04H 1/4209 |
| JP | 2012-144818 A | | 8/2012 | |
| KR | 10-2006-0043576 | | 5/2006 | |
| KR | 10-2007-0033310 | | 3/2007 | |
| KR | 10-0808117 | | 2/2008 | |
| KR | 10-2009-0117969 | | 11/2009 | |
| KR | 10-2011-0035728 | | 4/2011 | |
| KR | 20110035728 A | * | 4/2011 | ............. D04H 13/00 |
| KR | 10-2011-0098626 A | | 9/2011 | |
| KR | 10-2011-0128980 | | 12/2011 | |
| KR | 10-1150820 | | 5/2012 | |

* cited by examiner

<Highly heat-resistant sound absorbing and insulating material for vehicle>

<Aluminum heat protector>

<Highly heat-resistant sound absorbing and insulating material for vehicle>

<Aluminum heat protector>

MANUFACTURING METHOD OF HIGHLY HEAT-RESISTANT SOUND ABSORBING AND INSULATING MATERIALS

CROSS-REFERENCE TO RELATED APPLICATIONS

This application claims priority under 35 U.S.C. § 119 to Korean Patent Application No. 10-2012-0124945, filed on Nov. 6, 2012, in the Korean Intellectual Property Office, the disclosure of which is incorporated herein by reference in its entirety.

BACKGROUND (a) Technical Field

The present invention relates to a method for manufacturing a highly heat-resistant sound absorbing and insulating material. More specifically, it relates to a method for manufacturing a highly heat-resistant sound absorbing and insulating material which does not experience change in shape even under a high-temperature environment of 200° C. or greater and satisfies UL 94V-0 flame retardancy, which includes a beating and mixing step, a web forming step, a web stacking step, a needle punching step, a binder impregnating step and a solvent recovering step.

(b) Background Art

Various noises are generated while driving a vehicle. The vehicle noise is mainly generated from an engine or an exhaust system and is transferred to the inside of a vehicle by air. A sound absorbing and insulating material is used to reduce the noise generated from the engine and the exhaust system from being transferred to the inside of the vehicle. An insulation dash, a dash isolation pad, and the like are used to block the noise radiating from the engine from being transferred to the inside of the vehicle and a tunnel pad, a floor carpet, and the like are used to block the noise generated from the exhaust system and the floor from being transferred to the inside of the vehicle.

As sound absorbing materials for a vehicle, Korean Patent Publication No. 2004-0013840 discloses a 20-mm thick sound absorbing and insulating material having a PET fiber layer in which a synthetic resin film layer having a thickness of 40-100 μm in the lengthwise direction is inserted, and Korean Patent Publication No. 2002-0089277 discloses a process for preparing a sound absorbing insulation material of a nonwoven fabric form by cutting and beating a polyester fiber and an acrylic fiber, mixing with a low-melting-point polyester fiber at a specific ratio, and molding and heating the same. And, Korean Patent Publication No. 2006-0043576 discloses a method of coating at least one of a top layer and a bottom layer of a polyester (PET) felt with a resin, using a mixture fiber of a low-melting-point fiber (LMF) and a regular fiber.

The sound absorbing and insulating materials for vehicles reported thus far are limited in that weight is inevitably increased to reduce radiated noise from the engine or the exhaust system and the efficiency of reducing noise inside the vehicle is low when considering the weight increase. In order to overcome this limitation, it is necessary to install the sound absorbing and insulating material on a location closest to the engine or the exhaust system. To install the sound absorbing and insulating material on the location closest to the engine or the exhaust system, shape change should not occur even under a high-temperature environment of 200° C. or greater and flame retardancy should be ensured. For this reason, the currently used sound absorbing and insulating materials for vehicles cannot be used for such applications.

SUMMARY

The present invention is directed to providing a method for manufacturing a highly heat-resistant sound absorbing and insulating material which does not experience change in shape at a location closest to the noise source of an engine or an exhaust system under a high-temperature environment of 200° C. or greater and satisfies UL 94V-0 flame retardancy.

The present invention is also directed to providing a method for manufacturing a highly heat-resistant sound absorbing and insulating material which is applied to a location adjacent to a metal part which is at a temperature of 200° C. or greater to protect nearby plastic and rubber parts.

The present invention is also directed to providing a method for effectively manufacturing a new-concept highly heat-resistant sound absorbing and insulating material which can be molded as it is.

In one aspect, the present invention provides a method for manufacturing a highly heat-resistant sound absorbing and insulating material, including: a beating and mixing step of beating and mixing a fiber material containing a heat-resistant fiber; a web forming step of forming a web from the beaten and mixed fiber material; a web stacking step of stacking the formed web; a needle punching step of forming a nonwoven fabric by moving a needle up and down through the stacked web; a binder impregnating step of forming a binder-impregnated nonwoven fabric by immersing the nonwoven fabric in a binder solution; and a solvent recovering step of removing a solvent from the binder-impregnated nonwoven fabric to obtain a nonwoven fabric used as a sound absorbing and insulating material.

In another aspect, the present invention provides a method for manufacturing a highly heat-resistant sound absorbing and insulating material, including: a beating and mixing step of beating and mixing a fiber material containing: a heat-resistant fiber; a web forming step of forming a web from the beaten and mixed fiber material; a web stacking step of stacking the formed web; a needle punching step of forming a nonwoven fabric by moving a needle up and down through the stacked web; a binder impregnating step of forming a binder-impregnated nonwoven fabric by immersing the nonwoven fabric in a binder solution; a solvent recovering step of removing a solvent from the binder-impregnated nonwoven fabric; and a molding step of shaping the dried nonwoven fabric into a sound absorbing and insulating material having a desired shape.

In an exemplary embodiment of the present invention, the beating and mixing step may include beating a fiber material having a limiting oxygen index (LOI) of 25% or greater and a heat resistance temperature of 200° C. or greater, having 1-10 crimps/cm and having a diameter of 1-33 μm and a length of 20-100 mm, mixing one or more fiber material having a limiting oxygen index (LOI) of 25% or greater and a heat resistance temperature of 200° C. or greater, having 1-10 crimps/cm and having a diameter of 1-33 μm and a length of 20-100 mm, or performing beating and mixing under the above-described conditions.

In another exemplary embodiment of the present invention, the fiber material may include one or more selected from the group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber.

In an exemplary embodiment of the present invention, the web forming step may be a step wherein the fiber material beaten and mixed in the beating and mixing step is placed on a swift having workers on both sides and a cylinder of a carding machine as a fancy rotates at high speed and the fiber is combed to form a continuous web in the form of a thin sheet and may be performed by carding method.

In an exemplary embodiment of the present invention, the web stacking step may be a step wherein the web formed in the web forming step is stacked with each other by overlapping on a conveyor belt to form a stacked web and may be performed at a rate of 10 m/min or lower using a horizontal wrapper in order to prevent scattering of the web due to air resistance and breaking of the web on the conveyor belt.

In an exemplary embodiment of the present invention, the needle punching step may be a step wherein the stacked web formed in the web stacking step is bound to each other by moving a needle up and down through the stacked web and may be performed by one or more selected from the group consisting of single down needle punching, single up needle punching, double down needle punching and double up needle punching.

In another exemplary embodiment of the present invention, the needle punching step may include forming a nonwoven fabric with a needle stroke of 30-350 times/m$^2$.

In another exemplary embodiment of the present invention, the needle punching step may include forming a nonwoven fabric having a single layer thickness of 3-20 mm and a density of 100-2000 g/m$^2$.

In an exemplary embodiment of the present invention, the binder impregnating step may include immersing the nonwoven fabric formed in the needle punching step in a binder solution wherein a thermosetting binder resin having a heat resistance temperature of 200° C. or greater is dispersed in an organic solvent at a concentration of 5-70 wt %, based on the total weight of the binder solution.

In another exemplary embodiment of the present invention, the binder impregnating step may further include compressing the binder-impregnated nonwoven fabric at a pressure of 1-20 kgf/cm$^2$ to form a binder-impregnated nonwoven fabric having a density of 1,000-3,000 g/m$^2$.

In another exemplary embodiment of the present invention, the binder impregnating step may include impregnating 20-80 parts by weight of a thermosetting binder resin in 20-80 parts by weight of the nonwoven fabric.

In another exemplary embodiment of the present invention, the binder solution may contain 5-70 wt % of a binder resin, 0.1-10 wt % of a curing agent, 0.01-5 wt % of a catalyst, 1-40 wt % of an additive and a solvent as the balance, based on the total weight of the binder solution.

In another exemplary embodiment of the present invention, the binder resin may be an epoxy resin.

In another exemplary embodiment of the present invention, the epoxy resin may be one or more selected from the group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, bisphenol A diglycidyl ether polymer, phosphazene diglycidyl ether, bisphenol A novolac epoxy, phenol novolac epoxy resin, and o-cresol novolac epoxy resin.

In another exemplary embodiment of the present invention, the organic solvent may be one or more selected from the group consisting of methyl ethyl ketone (MEK) and dimethyl carbonate (DMC).

In an exemplary embodiment of the present invention, the solvent recovering step may be performed using a drying oven at 70-200° C. for 1-10 minutes in order to form a thermosetting felt wherein only the thermosetting binder resin is present in the nonwoven fabric by evaporating the organic solvent from the binder-impregnated nonwoven fabric formed in the binder impregnating step.

In another exemplary embodiment of the present invention, the nonwoven fabric that has passed through the solvent recovering step may contain 1-300 parts by weight of a binder based on 100 parts by weight of the nonwoven fabric.

In an exemplary embodiment of the present invention, the molding step may be performed at 150-300° C.

In another aspect, the present invention provides a method for reducing noise of a noise generating device, including: i) identifying the three-dimensional shape of a noise generating device; ii) manufacturing and molding a sound absorbing and insulating material so as to correspond partially or entirely to the three-dimensional shape of the device; and iii) bringing the sound absorbing and insulating material adjacent to the noise generating device.

In an exemplary embodiment of the present invention, the device may be a motor, an engine or an exhaust system.

In an exemplary embodiment of the present invention, said bringing the sound absorbing and insulating material adjacent to the noise generating device may include closely attaching the sound absorbing and insulating material to the noise generating device, installing the sound absorbing and insulating material to be spaced apart from the noise generating device or molding the sound absorbing and insulating material as a part of the noise generating device.

In the highly heat-resistant sound absorbing and insulating material manufactured by the method according to the present invention, the binder impregnated into the nonwoven fabric having irregular vent holes with a complicated three-dimensional labyrinth structure and is cured while maintaining the three-dimensional structure inside the nonwoven fabric without blocking the vent holes. Therefore, the physical properties of the nonwoven fabric including sound-absorbing property performance are improved and molding into a desired shape is possible during the curing of the binder.

Also, since highly heat-resistant sound absorbing and insulating material manufactured by the method according to the present invention wherein the binder is impregnated in the nonwoven fabric formed of the heat-resistant fiber exhibits superior flame retardancy, heat resistance and heat-insulating property in addition to sound-absorbing performance, the sound absorbing and insulating material does not experience deformation or denaturation when applied to a noise generating device which is maintained at temperatures of 200° C. or greater.

In addition, the method for manufacturing a highly heat-resistant sound absorbing and insulating material according to the present invention provides an effect of simplifying the manufacturing process because use of the thermosetting resin as the binder allows for molding into a desired shape while the thermosetting resin is cured.

Furthermore, the method for molding a highly heat-resistant sound absorbing and insulating material according to the present invention provides a highly heat-resistant sound absorbing and insulating material which is installed on a location closest to a noise source of an engine or an exhaust system and reduces noise radiating from the engine or the exhaust system.

In addition, the method for manufacturing a highly heat-resistant sound absorbing and insulating material according to the present invention provides a sound absorbing and insulating material which is applied to a location adjacent to a metal part which is at a temperature of 200° C. or greater to protect nearby plastic and rubber parts.

Accordingly, the sound absorbing and insulating material manufactured by the method of the present invention is useful for applications requiring arresting, absorbing or insulating of sound, including electric appliances such as air conditioner, refrigerator, washing machine, lawn mower, and the like, transportation such as vehicle, ship, airplane, and the like and construction materials such as wall material, flooring material and the like. In particular, the sound absorbing and insulating material manufactured by the method of the present invention is useful for a noise generating device maintained at high temperatures of 200° C. or greater. More particularly, when the sound absorbing and insulating material manufactured by the method of the present invention is used in a vehicle, it may be closely attached to a noise generating device of vehicle parts, such as engine, exhaust system, the like, installed to be spaced apart from the noise generating device or molded as a part of the noise generating device.

BRIEF DESCRIPTION OF THE DRAWINGS

FIG. 2(A) is an image of a nonwoven fabric prepared by needle punching. FIG. 2(B) and FIG. 2(C) show images of binder-impregnated nonwoven fabrics. FIG. 2(B) is an image of a binder-impregnated nonwoven fabric in which 20 parts by weight of a binder is impregnated in 80 parts by weight of a nonwoven fabric, and FIG. 2(C) is an image of a binder-impregnated nonwoven fabric in which 50 parts by weight of a binder is impregnated in 50 parts by weight of a nonwoven fabric.

FIG. 5(a) shows an image of a sound absorbing and insulating material molded for use in a vehicle engine, and FIG. 5(b) shows an image of the sound absorbing and insulating material installed on a part of a vehicle engine.

FIG. 6(a) shows an image of a sound absorbing and insulating material molded for use in a lower part of a vehicle, and FIG. 6(b) shows an image of the sound absorbing and insulating material installed on a lower part of a vehicle.

DETAILED DESCRIPTION

Hereinafter, specific exemplary embodiments of the present invention will be described in detail. However, they are only intended to describe the present invention in detail such that those of ordinary skill in the art to which the present invention belongs can easily carry out the invention and the technical idea and scope of the present invention are not limited by them.

The present invention provides a method for manufacturing a highly heat-resistant sound absorbing and insulating material, including: a beating and mixing step of beating and mixing a fiber material comprising a heat-resistant fiber having a limiting oxygen index (LOI) of 25% or greater and a heat resistance temperature of 200° C. or greater; a web forming step of forming the fiber material beaten and mixed in the beating and mixing step into a continuous web in the form of a thin sheet; a web stacking step of stacking the formed web; a web stacking step of forming a stacked web by overlapping and stacking the web formed in the web forming step with each other; a needle punching step of forming a nonwoven fabric by binding the stacked web formed in the web stacking step with each other by moving a needle up and down through the stacked web; a binder impregnating step of forming a binder-impregnated nonwoven fabric by immersing the nonwoven fabric formed in the needle punching step in a binder solution wherein a thermosetting binder resin having a heat resistance temperature of 200° C. or greater is dispersed in an organic solvent; and a solvent recovering step of forming a thermosetting felt for use as a sound absorbing and insulating material by removing the solvent from the binder-impregnated nonwoven fabric formed in the binder impregnating step such that only the thermosetting binder resin remains.

The method for manufacturing a highly heat-resistant sound absorbing and insulating material according to the present invention may further include, after the solvent recovering step, a molding step of shaping the dried nonwoven fabric to a sound absorbing and insulating material having a desired shape by molding at 150-300° C.

A sound absorbing and insulating material manufactured by the method according to the present invention has a binder distributed uniformly on the entire fiber yarn of the nonwoven fabric containing a heat-resistant fiber and has smaller-sized vent holes formed as compared to before the impregnation of the binder. Accordingly, it exhibits superior sound-absorbing performance, flame retardancy, heat resistance and heat-insulating property and can be molded into a desired three-dimensional shape due to the binder located in the same layer as the nonwoven.

Figure 1:
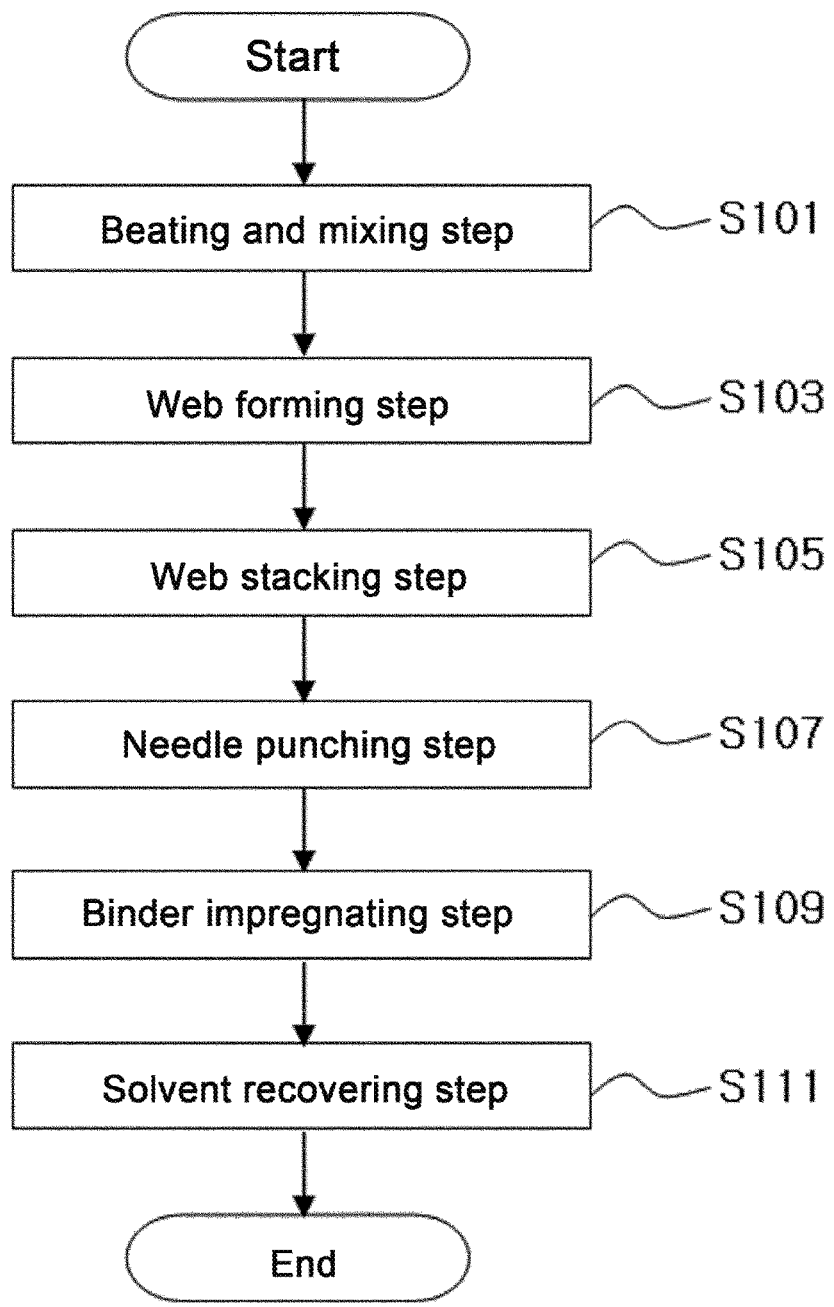
FIG. 1 shows a flow chart describing a method for manufacturing a highly heat-resistant sound absorbing and insulating material according to an exemplary embodiment of the present invention.

As seen from FIG. 1, the method for manufacturing a highly heat-resistant sound absorbing and insulating material according to the present invention includes a beating and mixing step S101, a web forming step S103, a web stacking step S105, a needle punching step S107, a binder impregnating step S109 and a solvent recovering step S111.

The method for manufacturing a highly heat-resistant sound absorbing and insulating material according to the present invention will be described in detail referring to the flow chart of FIG. 1.

The beating and mixing step S101 may include beating a fiber material having a limiting oxygen index (LOI) of 25% or greater and a heat resistance temperature of 200° C. or greater, having 1-10 crimps/cm and having a diameter of 1-33 μm and a length of 20-100 mm, mixing one or more fiber material having a limiting oxygen index (LOI) of 25% or greater and a heat resistance temperature of 200° C. or greater, having 1-10 crimps/cm and having a diameter of 1-33 μm and a length of 20-100 mm, or performing beating and mixing under the above-described conditions. Air blowing may be conducted to uniformly disperse the fiber.

The fiber material used in the beating and mixing step S101 of the present invention is a base material of the highly heat-resistant sound absorbing and insulating material and serves to reduce noise transferred to the inside of a vehicle by absorbing the noise radiating from an engine or an exhaust system.

In the present invention, a heat-resistant fiber having a limiting oxygen index (LOI) of 25% or greater and a heat resistance temperature of 150° C. or greater is used as the fiber material. The heat-resistant fiber may be any one that has superior durability so as to endure high-temperature and ultra-high-temperature conditions. Specifically, a heat-resistant fiber having a limiting oxygen index (LOI) of 25-80% and a heat resistance temperature of 150-3000° C. may be used. More specifically, a heat-resistant fiber having a limiting oxygen index (LOI) of 25-70% and a heat resistance temperature of 200-1000° C. may be used. And, the heat-resistant fiber may have a fineness of 1-15 denier, specifically 1-6 denier, and a yarn length of 20-100 mm, specifically 40-80 mm. When the yarn length is too short, the binding strength of the nonwoven fabric may become weak because of difficulty in yarn bridging during needle punching. And, when the yarn length is too long, the yarn may not be transferred as desired during carding although the nonwoven fabric may have good binding strength.

As the heat-resistant fiber, one known as 'superfiber' in the related art may be used. Specifically, the superfiber may be one or more selected from the group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber. Specifically, an aramid fiber may be used as the heat-resistant fiber in the present invention. Specifically, a meta-aramid fiber, a para-aramid fiber or a mixture thereof may be used as the heat-resistant fiber in the present invention.

The aramid fiber is an aromatic polyamide fiber in which aromatic rings such as benzene ring are bonded with each other by amide groups. The aromatic polyamide fiber is typically called 'aramid' and distinguished from an aliphatic polyamide, for example, nylon. The aramid fiber may be prepared by spinning of aromatic polyamide and classified as meta-aramid (m-aramid) and para-aramid (p-aramid) depending on the location of the amide bonds on the aromatic ring.

[Chemical Formula 1]

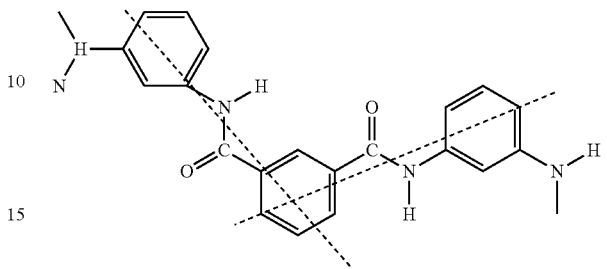

[Chemical Formula 2]

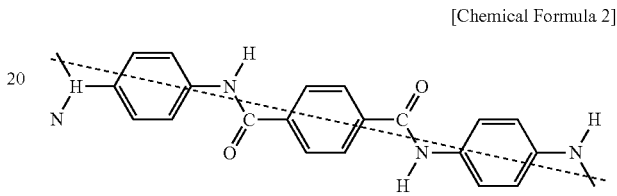

The meta-aramid (m-aramid) represented by Chemical Formula 1 may be prepared by dry spinning after dissolving isophthaloyl chloride and m-phenylenediamine in a dimethylacetamide (DMAc) solvent. The meta-aramid has a relatively high tensile elongation at break of 22-40% due to the uneven polymer structure. Also, it can be dyed and may be easily prepared into fibers. The meta-aramid is commercially available as Nomex™ (DuPont) and Conex™ (Teijin).

The para-aramid (p-aramid) represented by Chemical Formula 2 may be prepared by wet spinning after dissolving terephthaloyl chloride and p-phenylenediamine in an N-methylpyrrolidone (NMP) solvent. The para-aramid has high strength due to its highly oriented linear molecular structure, about 3-7 times greater compared to meta-aramid. For this reason, the p-aramid is used for reinforcement or protection materials. Also, the p-aramid has strong chemical resistance, reduced thermal shrinkage, superior dimensional stability and high tear strength as well as flame resistance and self-extinguishing property. The para-aramid is commercially available as Kevlar™ (DuPont), Twaron™ (Teijin) and Technora™ (Teijin).

The aramid is provided in the form of filament, staple, yarn and the like and is used for reinforcing materials (e.g., transformer, motor, and the like), insulating materials (e.g., insulating paper, insulating tape, and the like), heat-resistant fibers (e.g., fireproof clothing, fireproof gloves, and the like), high-temperature filters, or the like.

Although a heat-resistant fiber is used as the fiber material for preparing the sound absorbing and insulating material in the present invention, another fiber may be further included in addition to the yarn of the heat-resistant fiber for the purpose of cost reduction, weight decrease, functionality, and the like. That is to say, although the sound absorbing and insulating material of the present invention is prepared from a heat-resistant fiber as a yarn, it is not limited to a sound absorbing and insulating material consisting only of a heat-resistant fiber. The heat-resistant fiber yarn included in the sound absorbing and insulating material of the present invention may be included in an amount of 30-100 wt %, more specifically 60-100 wt %, based on the total weight of the fiber material.

In the web forming step S103, the fiber material beaten and mixed in the beating and mixing step S101 is placed on a swift having workers on both sides and a cylinder of a carding machine as a fancy rotates at high speed and the fiber is combed to form a continuous web in the form of a thin sheet. This step, which is performed by carding method, provides bulkiness to the formed web and minimizes weight scattering by maximizing fiber modification efficiency.

In the web stacking step S105, the web formed in the web forming step S103 is stacked with each other by overlapping on a conveyor belt to form a stacked web and is performed at a rate of 10 m/min or lower using a horizontal wrapper in order to prevent scattering of the web due to air resistance and breaking of the web on the conveyor belt.

The needle punching step S107 is a step wherein the stacked web formed in the web stacking step S105 is bound to each other by moving a needle up and down through the stacked web in a direction perpendicular or oblique or both to the surface of the stacked web and is performed by one or more selected from the group consisting of single down needle punching, single up needle punching, double down needle punching and double up needle punching. In this step, the binding strength of the nonwoven fabric is increased as the stacked web arranged in a horizontal direction is partly arranged vertically.

The nonwoven fabric formed in the needle punching step S107 has a single layer thickness of 3-20 mm and a density of 100-2000 g/m$^2$. Sound-absorbing performance may vary depending on the thickness and density of the nonwoven fabric. It is expected that the sound-absorbing performance will be increased with increasing thickness and density of the nonwoven fabric. When considering the industrial application, and the like of the sound absorbing and insulating material of the present invention, it is preferred that the nonwoven fabric has a thickness of 3-20 mm. When the thickness of the nonwoven fabric is smaller than 3 mm, the durability and moldability of the sound absorbing and insulating material may be unsatisfactory. And, when the thickness is greater than 20 mm, productivity may decrease and production cost may increase during manufacturing and processing the nonwoven fabric. In addition, the density of the nonwoven fabric may be 100-2000 g/m$^2$, specifically 200-1200 g/m$^2$, more specifically 300-800 g/m$^2$, in the aspects of performance and cost.

The aramid nonwoven fabric is formed by stacking a web of 30-100 g/m$^2$ which is formed by carding method 2- to 12-fold and continuously performing up-down preneedling, down-up needling and up-down needling, thereby forming physical bridges and providing the desired thickness, binding strength and other desired physical properties. The needle used to perform the needling may be a barb-type needle, having a working blade of 0.5-3 mm and a needle length (crank outside-to-point distance) of 70-120 mm. Specifically, the needle stroke may be 30-350 times/m$^2$.

More specifically, the fineness of the yarn for the nonwoven fabric may be 1.5-8.0 denier, the thickness of the pile layer may be 6-13 mm, the needle stroke may be 120-250 times/m$^2$, and the density of the nonwoven fabric may be 300-800 g/m$^2$.

The binder impregnating step S109 includes immersing the nonwoven fabric formed in the needle punching step S107 in a binder solution wherein a thermosetting binder resin having a heat resistance temperature of 200° C. or greater is dispersed in an organic solvent at a concentration of 5-70 wt %. The binder impregnating step S109 may further include, if necessary, compressing the binder-impregnated nonwoven fabric. The compression is performed to control the content of the thermosetting binder resin in the nonwoven fabric. Specifically, the compression may be performed at a pressure of 1-20 kgf/cm$^2$ using a commonly used compression roller in order to form a binder-impregnated nonwoven fabric having a density of 1,000-3,000 g/m$^2$. Specifically, the compression may be performed using a compression roller, e.g., a mangle roller, at a pressure of 5-15 kgf/cm$^2$ to form a binder-impregnated nonwoven fabric having a density of 1,000-2,000 g/m$^2$.

The binder impregnating step S109 includes impregnating 20-80 parts by weight of a thermosetting binder resin in 20-80 parts by weight of the nonwoven fabric.

The binder impregnating step S109 not only improves the sound-absorbing and insulating performance but also allows for molding into a sound absorbing and insulating material having a desired shape.

The nonwoven fabric has a structure in which fibers are randomly arranged in three dimensions, although there may be some variations depending on the manufacturing method. Therefore, the inside of the nonwoven fabric may have a very complicated, three-dimensionally interconnected labyrinth structure, which is formed by regularly or irregularly arranged fibers, may be, rather than bundles of independent capillary tubes. Thus, the nonwoven fabric formed in the needle punching step S107 has irregular vent holes (microcavities) formed as the yarns containing the heat-resistant fiber loosely cross one another.

In the present invention, by performing the binder impregnating step S109 of immersing the nonwoven fabric in the binder solution, the binder is distributed uniformly on the entire fiber yarn of the nonwoven fabric containing the heat-resistant fiber and, as a result, the vent holes with a smaller size as compared to before the impregnation of the binder are formed while substantially maintaining the intrinsic three-dimensional pore structure of the nonwoven fabric. The formation of fine vent holes in the internal structure of the nonwoven fabric provides an extended resonance path of noise and, thus, provides improved sound-absorbing performance. When the binder resin forms a three-dimensional network structure as it is cured, the sound-absorbing performance can be further improved by forming more and finer vent holes inside the nonwoven fabric. Accordingly, since the nonwoven fabric may maintain the intrinsic (original) three-dimensional shape as the binder is uniformly impregnated into the nonwoven fabric, and additionally, since more fine vent holes (microcavities) may be formed as the binder is cured, the sound absorbing and insulating material of the present invention may have remarkably improved sound-absorbing performance due to the maximized noise absorption through the increased resonance of noise in the nonwoven fabric.

In the binder-impregnated nonwoven fabric that has passed through the binder impregnating step S109, the binder is located in the same layer as the nonwoven fabric so as to maintain the three-dimensional structure inside the nonwoven fabric. Accordingly, the binder used in the present invention may be any binder as long as it can maintain the three-dimensional structure inside the nonwoven fabric. The expression 'maintain the three-dimensional structure inside the nonwoven fabric' means that the binder, which is impregnated in the nonwoven fabric, is distributed uniformly on the entire fiber yarn surface of the nonwoven fabric and maintains or further forms irregular vent holes, thereby maintaining the intrinsic three-dimensional shape of the nonwoven fabric.

Although a binder generally refers to a material used to bond or join two materials, the binder used in the present invention refers to a material impregnated in the nonwoven fabric formed of the heat-resistant fiber.

Various materials may be used as the binder impregnated into the nonwoven fabric. First of all, a thermoplastic resin or a thermosetting resin may be considered as the binder material.

The thermoplastic resin such as a polyamide-based resin has crystalline polar groups like the aramid fiber which is a representative heat-resistant fiber. When a thermoplastic binder is impregnated into the nonwoven fabric formed of the thermoplastic heat-resistant fiber, a solid interfacial layer is formed between the thermoplastic binder and the thermoplastic heat-resistant fiber due to face-to-face contact between their crystalline polar groups, thereby partially blocking or covering the vent holes of the nonwoven fabric. As a consequence, when a thermoplastic resin is used as the binder impregnated into the nonwoven fabric formed of the heat-resistant fiber, sound-absorbing performance may be reduced due to the partial blocking of the vent holes of the nonwoven fabric. At a glimpse, it may be thought that the sound-insulating performance would be improved if the vent holes are blocked. However, since noise is not eliminated inside the nonwoven fabric but is transmitted via other routes, improvement of the sound-absorbing performance may not be obtained if the thermoplastic binder is impregnated in the nonwoven fabric. In addition, when the thermoplastic binder is impregnated into a nonwoven fabric formed of the inorganic-based heat-resistant fiber, an adhesive additive has to be added because of weak adhesive property between them.

In contrast, a thermosetting binder is a material having significantly different physical and chemical properties from those of the thermoplastic heat-resistant fiber. Accordingly, when a thermosetting binder is impregnated into the nonwoven fabric formed of the thermoplastic heat-resistant fiber, an interfacial layer is formed by edge-to-edge contact because of the different properties. As a result, the vent holes of the nonwoven fabric remain open. Therefore, when a thermosetting resin is used as the binder impregnated into the nonwoven fabric formed of the heat-resistant fiber, the three-dimensional structure inside the nonwoven fabric may be maintained. Accordingly, a thermosetting resin may be used as the binder in the present invention.

In addition, the thermosetting resin is curable by light, heat or a curing agent and its shape does not change even under a high-temperature condition. Accordingly, in accordance with the present invention, the shape of the sound absorbing material can be maintained even under a high-temperature condition after molding by employing the heat-resistant fiber and the thermosetting binder under specific conditions. As a consequence, when the thermosetting binder resin is used as the binder impregnated into the nonwoven fabric, molding into a desired shape is possible during the curing of the resin and the shape can be maintained even under a high-temperature condition.

As described above, when the thermosetting resin is used as the binder impregnated into the nonwoven fabric formed of the heat-resistant fiber, the three-dimensional structure inside the nonwoven fabric can be maintained and molding into a desired shape is possible during the curing of the binder resin.

Specifically, an epoxy resin may be used as the binder. The epoxy resin is one of thermosetting resins and is cured into a polymer martial having a three-dimensional network structure. Accordingly, since the epoxy resin forms a network structure and another vent holes when cured inside the nonwoven fabric, additional fine vent holes may be formed inside the nonwoven fabric and the sound-absorbing performance may be further improved.

When the curing is carried out in the presence of a curing agent, a more complicated three-dimensional network structure may be formed and, thus, the sound-absorbing effect may be further improved. In detail, a three-dimensional network-structured polymer may be formed as the epoxide groups or hydroxyl groups of the epoxy resin react with the functional groups of the curing agent such as amine groups or carboxylic acid groups to form covalent crosslinkages. The curing agent serves as a catalyst that catalyzes curing reaction and is involved in the reaction and linked to the chemical groups of the epoxy resin. Accordingly, the size and physical properties of the vent holes may be controlled by selecting different curing agents.

The epoxy resin may be one or more epoxy resin selected from the group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, bisphenol A diglycidyl ether polymer, phosphazene diglycidyl ether, bisphenol A novolac epoxy, phenol novolac epoxy resin and o-cresol novolac epoxy resin, and the like. More specifically, the epoxy resin may have an epoxy equivalent of 70-400. When the epoxy equivalent is too low, intermolecular binding may be too weak to form the three-dimensional network structure or the physical properties of the sound absorbing and insulating material may become unsatisfactory because of reduced adhesion with the heat-resistant fiber. In contrast, when the epoxy equivalent is too high, the sound-absorbing performance may be unsatisfactory because an excessively dense network structure is formed.

When the thermosetting resin is used as the binder in the present invention, a curing agent may be further included in the binder solution. As the curing agent, a compound having a functional group that may readily react with the functional groups of the thermosetting binder resin such as epoxide groups or hydroxyl groups may be used. For example, an aliphatic amine, an aromatic amine, an acid anhydride, urea, an amide, imidazole, and the like may be used as the curing agent. As specific examples of the curing agent, one or more selected from the group consisting of diethyltoluenediamine (DETDA), diaminodiphenylsulfone (DDS), boron trifluoride-monoethylamine ($BF_3$.MEA), diaminocyclohexane (DACH), methyltetrahydrophtalic anhydride (MTHPA), methyl-5-norbornene-2,3-dicarboxylic anhydride (NMA), dicyandiamide (Dicy), 2-ethyl-4-methylimidazole, and the like may be used. More specifically, an aliphatic amine- or amide-based curing agent may be used due to improved crosslinking ability and very superior chemical resistance and weather resistance. In particular, dicyandiamide (Dicy) may be used in consideration of crosslinking ability, flame retardancy, heat resistance, storage stability, processability, and the like. Since dicyandiamide (Dicy) has a high melting point above 200° C., it may provide superior storage stability after being mixed with the epoxy resin and may ensure sufficient processing time for curing and molding.

In the present invention, a catalyst that facilitates the curing of the thermosetting resin used as the binder may be used. The catalyst may be one or more selected from the group consisting of urea, dimethylurea, a tetraphenylborate salt of quaternary DBU, and quaternary phosphonium bromide. The catalyst may be contained in the binder-containing solution.

In addition, various additives, for example, a flame retardant, a heat resistance improver, a water repellent, and the like, may be used to provide additional functionalities to the sound absorbing and insulating material. The additive may be contained in the binder solution and, thus, no additional surficial material for providing functionalities to the sound absorbing and insulating material is necessary.

The flame retardant may be a melamine, a phosphate, a metal hydroxide, and the like. Specifically, the flame retardant may be one or more selected from the group consisting of melamine, melamine cyanurate, melamine polyphosphate, phosphazene, ammonium polyphosphate, and the like. More specifically, the flame retardant may be melamine, which enhances flame retardancy and heat resistance simultaneously.

The heat resistance improver may be alumina, silica, talc, clay, glass powder, glass fiber, metal powder, and the like.

And, one or more fluorine-based water repellent may be used as the water repellent.

In addition, additives commonly used in the related art may be selected depending on desired purposes.

The binder solution used in the binder impregnating step S109 contains, in addition to the binder resin, a curing agent, a catalyst, a commonly used additive and a solvent.

The binder, the curing agent, the catalyst and the additive contained in the binder solution are the same as described above. The solvent used to prepare the binder solution may be one or more selected from the group consisting of a ketone, a carbonate, an acetate, a cellosolve, and the like. Specifically, the solvent may be one or more selected from the group consisting of acetone, methyl ethyl ketone (MEK), methyl isobutyl ketone (MIBK), dimethyl carbonate (DMC), ethyl acetate, butyl acetate, methyl cellosolve, ethyl cellosolve, butyl cellosolve, and the like.

Specifically, the binder solution contains 5-70 wt % of a binder and a solvent as the balance. The binder solution used in the present invention may further contain other additives including a curing agent and a catalyst. In this case, the binder solution may contain 5-70 wt % of a binder resin, 0.1-10 wt % of a curing agent, 0.01-5 wt % of a catalyst, 1-40 wt % of an additive and a solvent as the balance, based on the total weight of the binder solution. More specifically, the binder solution may contain 1-30 wt % of a binder, 0.1-10 wt % of a curing agent, 0.01-5 wt % of a catalyst, 1-30 wt % of a flame retardant as an additive and 40-95 wt % of a solvent, based on the total weight of the binder solution.

In the present invention, the degree of impregnation into the nonwoven fabric may be controlled with the concentration of the binder solution. For example, the binder solution may be prepared to have a solid content of 1-60 wt %, more specifically 20-50 wt %, based on the total weight of the binder solution. When the binder solution is too dilute, the purpose of the present invention may not be accomplished because the content of the binder impregnated into the nonwoven fabric is small. In contrast, when the binder solution is too concentrated, the nonwoven fabric may become hard and may not serve as a sound absorbing and insulating material.

In addition, when the content of the curing agent contained in the binder solution is too small, molding to a desired shape may be difficult because curing of the binder may not be completed. As a result, the effect of improving the mechanical strength of the sound absorbing and insulating material may not be achieved. And, when the content of the curing agent is too large, the sound absorbing and insulating material may become hard and storage stability or the like may be unsatisfactory. Furthermore, when the content of the catalyst is too small, the effect for facilitating reaction may not be sufficiently provided. In contrast, when the content of the catalyst is too large, storage stability and the like may be unsatisfactory. The additive may be one or more additive commonly used in the related art, which is selected from a flame retardant, a heat resistance improver, a water repellent, and the like The content of these additives may be adjusted adequately depending on the purpose of addition. When the amount of additives is smaller than the above-described range, the desired effect may not be achieved. And, when the amount of the additives is greater than the above-described range, it is undesirable in terms of economy and undesired side effects may be caused.

Figure 2:
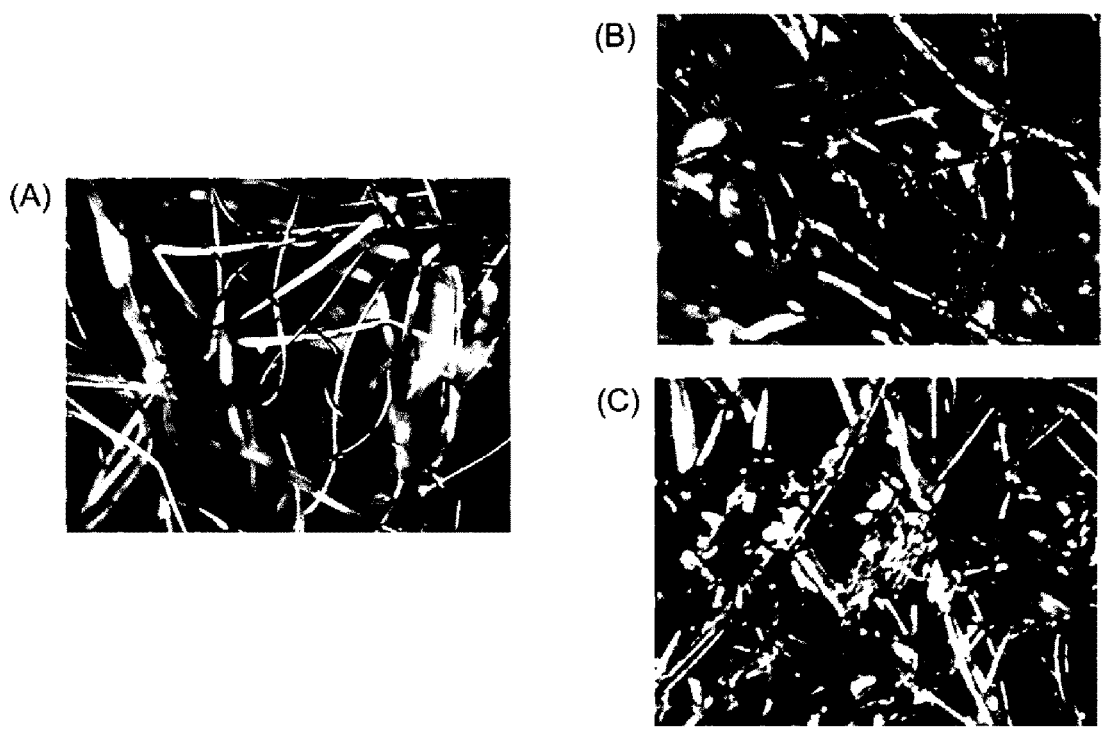
FIG. 2 shows electron microscopic images (×300) of nonwoven fabrics before and after impregnation of a binder.

FIG. 2 shows electron microscopic images showing the three-dimensional structure inside of nonwoven fabrics before and after impregnation of a binder.

FIG. 2(A) is an electron microscopic image showing the internal structure of a nonwoven fabric before impregnation of a binder. It can be seen that heat-resistant fiber yarns cross each other to form irregular vent holes. FIGS. 2(B) and (C) are electron microscopic images showing the internal structure of the nonwoven fabric after impregnation of a binder. It can be seen that the binder is finely and uniformly distributed and attached to the heat-resistant fiber yarns and that the content of the binder on the yarn surface increases as the content of the binder increases.

As can be seen from the electron microscopic images of FIG. 2, in the sound absorbing and insulating material of the present invention, the binder is uniformly distributed on the surface of the heat-resistant fiber yarns constituting the nonwoven fabric.

The solvent recovering step S111 is a step wherein a thermosetting felt wherein only the thermosetting binder resin is present is formed by evaporating the organic solvent from the binder-impregnated nonwoven fabric formed in the binder impregnating step S109. The solvent recovering step S111 may be performed using a drying oven at 70-200° C., specifically 100-150° C., for 1-10 minutes.

Through the solvent recovering step S111, harmful materials that may be generated as the organic solvent is evaporated may be removed and the physical properties of the sound absorbing and insulating material may be controlled by controlling the binder content in the nonwoven fabric. The content of the binder contained in the dried nonwoven fabric is an important factor affecting the size, shape and distribution of the vent holes inside the sound absorbing and insulating material, and the sound-absorbing performance and mechanical property of the sound absorbing and insulating material may be controlled therewith. In the present invention, the final content of the binder contained in the nonwoven fabric may be controlled to 1-300 parts by weight, more specifically 30-150 parts by weight, based on 100 parts by weight of the nonwoven fabric through the drying process. Through the drying process, the nonwoven fabric may be prepared into a thermosetting felt having a density of 300-1500 g/m$^2$, specifically 300-1000 g/m$^2$. And, the final content of the binder in the thermosetting felt may be controlled to 50-800 g/m$^2$, specifically 100-500 g/m$^2$.

The present invention also provides a method for manufacturing a sound absorbing and insulating material, which further includes, after the solvent recovering step S111, a molding step S121 of preparing a sound absorbing and insulating material by molding the dried nonwoven fabric at high temperature.

Specifically, the method for manufacturing a highly heat-resistant sound absorbing and insulating material according to the present invention includes a beating and mixing step S101, a web forming step S103, a web stacking step S105, a needle punching step S107, a binder impregnating step S109, a solvent recovering step S111 and a molding step S121.

In the molding step S121, the dried nonwoven fabric obtained in the solvent recovering step S111 is prepared into a sound absorbing and insulating material having a desired shape by molding at high temperature. The molding at high temperature also involves the curing of the thermosetting binder and is performed at 150-300° C., more specifically 170-230° C.

The internal structure of the sound absorbing and insulating material manufactured according to the method of the present invention can be identified by electron microscopic images. The electron microscopic image reveals that, inside the sound absorbing and insulating material of the present invention, vent holes with sizes of 1-100 μm are distributed regularly or irregularly with a spacing of 0.1-500 μm.

Figure 3:
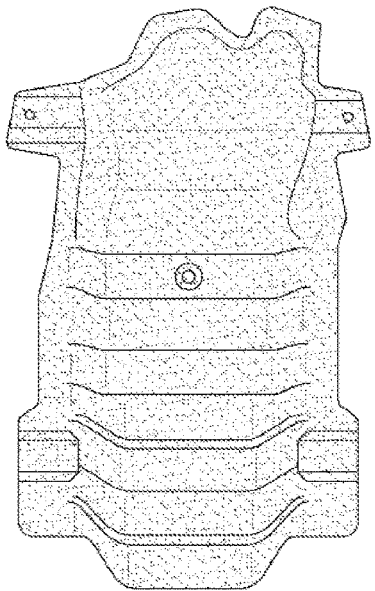
FIG. 3 shows a highly heat-resistant sound absorbing and insulating material manufactured by a method for manufacturing a highly heat-resistant sound absorbing and insulating material according to an exemplary embodiment of the present invention and an existing aluminum heat protector.
Figure 3:
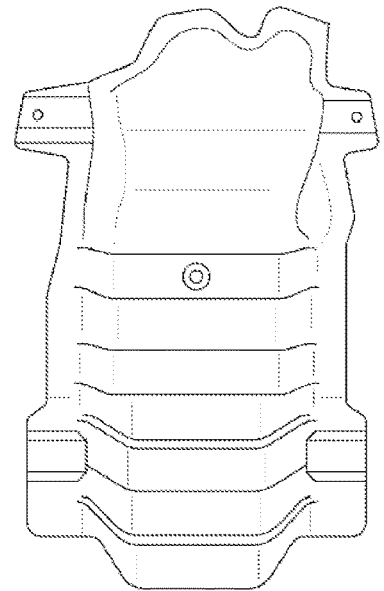

FIG. 3 compares the highly heat-resistant sound absorbing and insulating material manufactured by the method of the present invention with an existing aluminum heat protector.

The present invention also provides a method for reducing noise of a noise generating device, including: i) identifying the three-dimensional shape of a noise generating device; ii) manufacturing and molding a sound absorbing and insulating material so as to correspond partially or entirely to the three-dimensional shape of the device; and iii) bringing the sound absorbing and insulating material adjacent to the noise generating device.

The device refers to any noise generating device including a motor, an engine, an exhaust system, and the like However, the device of the present invention is never limited to the motor, engine and exhaust system. The sound absorbing and insulating material may be manufactured to correspond partially or entirely to the three-dimensional shape of the device. Since the sound absorbing and insulating material of the present invention may be molded during the curing of the binder, the sound absorbing and insulating material of the present invention may be molded to correspond partially or entirely to the three-dimensional shape of the device.

As used herein, the expression "adjacent" may mean closely attaching the sound-absorbing material to the noise generating device, installing the sound absorbing and insulating material to be spaced apart from the noise generating device or molding the sound absorbing and insulating material as a part of the noise generating device. Further, the expression "adjacent" in the present invention may include installing the sound-absorbing material on a member (e.g., another sound absorbing and insulating material) connected to the noise generating device.

Figure 4:
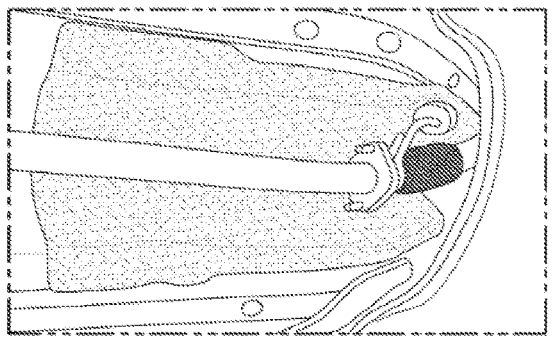
FIG. 4 shows a highly heat-resistant sound absorbing and insulating material manufactured by a method for manufacturing a highly heat-resistant sound absorbing and insulating material according to an exemplary embodiment of the present invention and an existing aluminum heat protector, which are respectively installed to reduce radiated noise from an exhaust system.
Figure 4:
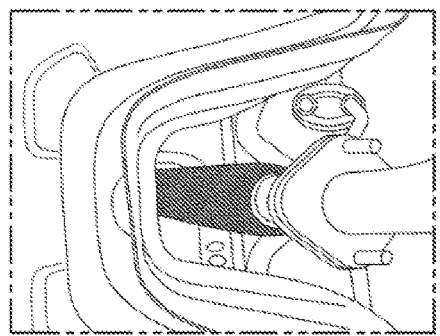
Figure 5:
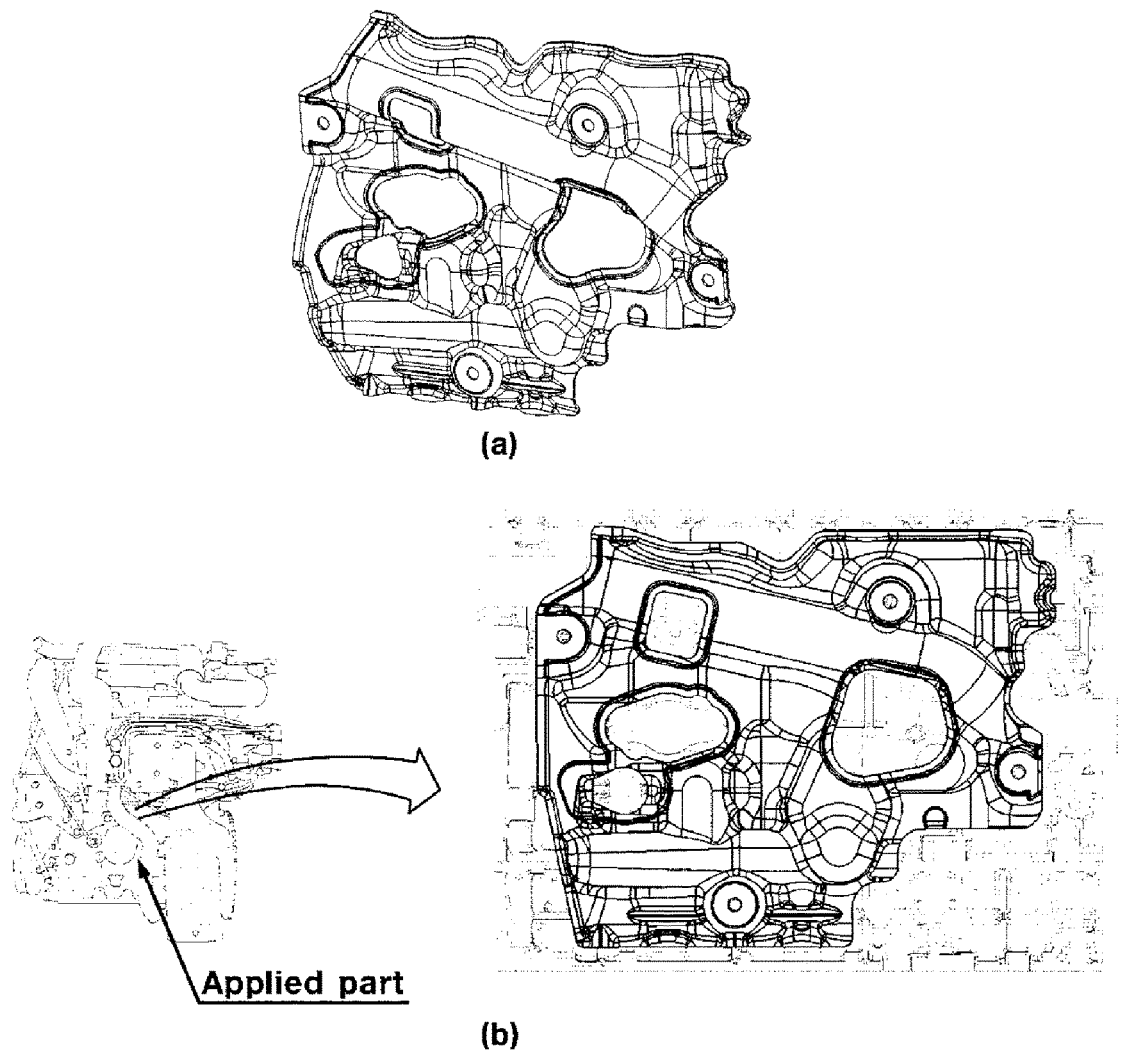
FIG. 5 schematically shows an example wherein a sound absorbing and insulating material is molded and applied to a noise generating device of a vehicle.
Figure 6:
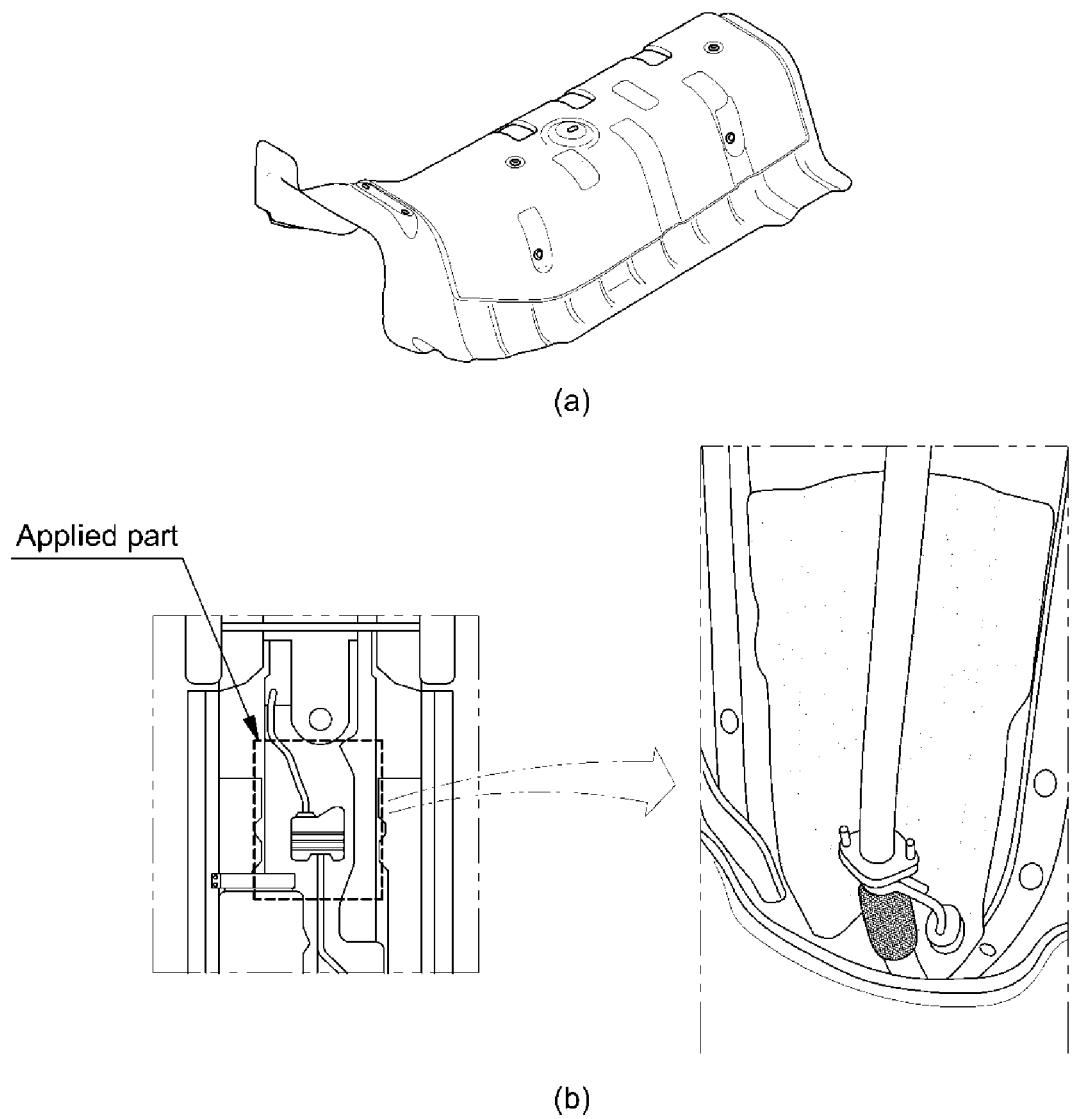
FIG. 6 schematically shows an example wherein a sound absorbing and insulating material is applied to a noise generating device of a vehicle to be spaced apart from the noise generating device.

FIG. 4, FIG. 5 and FIG. 6 schematically show representative examples wherein the sound absorbing and insulating material of the present invention is applied to a noise generating device of a vehicle.

FIG. 4 shows a highly heat-resistant sound absorbing and insulating material manufactured by the method of the present invention and an existing aluminum heat protector, which are respectively installed to reduce radiated noise from an exhaust system.

FIG. 5 schematically shows an example wherein a sound absorbing and insulating material is molded and applied to a noise generating device of a vehicle. FIG. 5(a) shows an image of a sound absorbing and insulating material molded for use in a vehicle engine, and FIG. 5(b) shows an image of the sound absorbing and insulating material installed on a part of a vehicle engine.

FIG. 6 schematically shows an example wherein a sound absorbing and insulating material is applied to a noise generating device of a vehicle to be spaced apart from the noise generating device. FIG. 6(a) shows an image of a sound absorbing and insulating material molded for use in a lower part of a vehicle, and FIG. 6(b) shows an image of the sound absorbing and insulating material installed on a lower part of a vehicle.

As described above, since the sound absorbing and insulating material of the present invention, wherein a binder is impregnated into a nonwoven fabric to maintain the three-dimensional structure inside thereof, has superior sound-absorbing performance, flame retardancy, heat resistance and heat-insulating property, it can exert its inherent sound absorbing and insulating effect when applied to a noise generating device maintained not only at normal temperatures but also at high temperatures of 200° C. or greater without deformation of the molded product.

EXAMPLES

The present invention will be described in more detail through examples. However, the present invention is not limited by the examples.

Hereinafter, a method for manufacturing a highly heat-resistant sound absorbing and insulating material according to the present invention and an effect of the highly heat-resistant sound absorbing and insulating material will be described through examples.

Example 1. Preparation of Highly Heat-Resistant Sound Absorbing and Insulating Material 1) Preparation of Nonwoven Fabric A meta-aramid (m-aramid) fiber having 6 crimps/cm and a fineness of 2 denier and a length of 76 mm was beaten by air blowing and formed into a web of 30 g/m² through carding. The web was stacked by overlapping 10-fold on a conveyor belt operated at 5 m/min using a horizontal wrapper. A nonwoven fabric having a density of 300 g/m² and a thickness of 4 mm was prepared by performing single up needle punching, double down needle punching and then double up needle punching in a direction perpendicular to the surface of the stacked web.

2) Preparation of Thermosetting Binder Resin Solution

A thermosetting binder resin solution was prepared by mixing an epoxy resin consisting of a mixture of bisphenol A diglycidyl ether, polyoxypropylene diglycidyl ether and phosphazene diglycidyl ether with 10 wt % of a cyanoguanidine curing agent based on the epoxy resin, a 8 wt % of a bisdimethylurea compound based on the epoxy resin and 30 wt % of a melamine cyanurate flame retardant based on the epoxy resin.

3) Preparation of Thermosetting Felt

The thermosetting binder resin solution prepared in 2) was dispersed in a dimethyl carbonate (DMC) organic solvent such that the concentration of the thermosetting binder resin was 25 wt %. After immersing the nonwoven fabric prepared in 1) therein, a binder-impregnated nonwoven fabric having a density of 1,500 g/m² was formed by compressing at a pressure of 8 kgf/cm² using a mangle roller. The binder-impregnated nonwoven fabric was passed through a first drying oven set at 100° C., a second drying oven set at 120° C., a third drying oven set at 150° C. and a fourth drying oven set at 150° C. at a speed of 5 m/min, thereby removing 900 g/m² of the organic solvent such that 300 g/m² of the thermosetting binder resin remained. As a result, a thermosetting felt having a density of 600 g/m² was prepared.

Comparative Example 1. Preparation of Existing Aluminum Heat Protector

A heat protector was prepared from 1-mm thick aluminum, which is commonly used to insulate heat generated from an exhaust system, using a heat protector mold.

Comparative Example 2. Preparation of Sound Absorbing and Insulating Material Formed of Aramid Nonwoven Fabric An aramid nonwoven fabric having a density of 300 g/m² and a thickness of 6 mm was prepared by needle punching in the same manner as described in Example 1, 1).

Comparative Example 3. Preparation of Sound Absorbing and Insulating Material Formed of Epoxy Resin-Coated Aramid Nonwoven Fabric An aramid nonwoven fabric having a density of 300 g/m² and a thickness of 6 mm was prepared by needle punching in the same manner as described in Example 1, 1). Then, molding was performed after coating an epoxy resin on the surface of the nonwoven fabric such that the binder content was 50 parts by weight based on 100 parts by weight of the nonwoven fabric and drying at 150° C.

The coating solution contained 8 wt % of bisphenol A diglycidyl ether, 2 wt % of bisphenol A diglycidyl ether polymer, 0.2 wt % of dicyandiamide, 0.02 wt % of dimethylurea, 10 wt % of melamine cyanurate and 79.78 wt % of dimethyl carbonate, based on the total weight of the coating solution.

Comparative Example 4. Preparation of Sound Absorbing and Insulating Material Formed of Thermoplastic Resin-Impregnated Aramid Nonwoven Fabric An aramid nonwoven fabric having a density of 300 g/m² and a thickness of 6 mm was prepared by needle punching in the same manner as described in Example 1, 1), immersed in a binder solution, dried and then molded.

A thermoplastic resin solution containing 10 wt % of polyethylene resin, 10 wt % of melamine cyanurate and 80 wt % of a dimethyl carbonate (DMC), based on the total weight of the thermoplastic resin solution, was used as the binder solution.

Comparative Example 5. Preparation of Sound Absorbing and Insulating Material Formed of Epoxy Resin-Impregnated PET Nonwoven Fabric A polyethylene terephthalate (PET) nonwoven fabric having a density of 300 g/m² and a thickness of 6 mm was prepared was prepared by needle punching in the same manner as described in Example 1, 1), immersed in a binder solution, dried and then molded.

The PET nonwoven fabric of Preparation Example 5 showed thermal deformation due to the reaction heat generated during the epoxy curing process and showed complete thermal deformation during the drying and thermal molding processes. As a result, molding to a desired shape was impossible.

A 3-mm thick, highly heat-resistant sound absorbing and insulating material test specimen was prepared by hot compressing the 600 g/m² thermosetting felt prepared in Example 1 at 200° C. for 200 seconds with a pressure of 100 kgf/cm².

The sound-absorbing rate of the highly heat-resistant sound absorbing and insulating material test specimen was measured according to the ISO R 354, Alpha Cabin method. The average of the sound-absorbing rate measured for three specimens is given in Table 1.

TABLE 1

| | Frequency | | | |
|---|---|---|---|---|
| | 1,000 Hz | 2,000 Hz | 3,150 Hz | 5,000 Hz |
| Sound-absorbing rate | 0.07 | 0.18 | 0.37 | 0.66 |

The aluminum material showed a sound-absorbing rate of 0. In contrast, as shown in Table 1, the highly heat-resistant sound absorbing and insulating material prepared according to the method for manufacturing a highly heat-resistant sound absorbing and insulating material according to the present invention showed excellent effect of reducing noise inside a vehicle by reducing the noise radiated from an engine and an exhaust system when applied to a location closest to the engine and the exhaust system noise source.

While applying heat from a heat source maintained at 250° C. to the highly heat-resistant sound absorbing and insulating material which was prepared by molding the thermosetting felt having a density of 600 g/m² prepared in Example 1 at 200° C. for 200 seconds with a pressure of 100 kgf/cm² using a heat protector mold and to the aluminum heat protector prepared in Comparative Example 1, temperature was measured on the opposite side. The result is shown in Table 2. In addition, to evaluate the performance of the highly heat-resistant sound absorbing and insulating material prepared in Example 1, a 3rd gear W.O.T PG test was conducted on a diesel vehicle (U2 1.7). The result is shown in Table 3. Further, a result of measuring noise inside the vehicle under an idle neutral gear is shown in Table 4.

TABLE 2

| Temperature measured on opposite side of sound absorbing and insulating material or aluminum heat protector (° C.) | | | | | | | |
|---|---|---|---|---|---|---|---|
| Heating time (sec) | 0 | 100 | 200 | 300 | 400 | 500 | 600 |
| Sound absorbing and insulating material (Example 1) | 0 | 98 | 107 | 112 | 113 | 114 | 115 |
| Aluminum heat protector (Comparative Example 1) | 0 | 110 | 122 | 124 | 125 | 126 | 126 |

From Table 2, it can be seen that the highly heat-resistant sound absorbing and insulating material prepared according to the method for manufacturing a highly heat-resistant sound absorbing and insulating material according to the present invention not only improves noise inside of a vehicle but also can protect nearby plastic and rubber parts by insulating heat, when applied instead of the aluminum heat protector which is commonly used to insulate heat.

TABLE 3

| | Product weight | 3rd gear W.O.T 2,000-4,000 rpm AI (%) average | |
|---|---|---|---|
| | (g) | Front seat | Back seat |
| Sound absorbing and insulating material (Example 1) | 170 | 81.4 | 80 |
| Aluminum heat protector (Comparative Example 1) | 505 | 80 | 78 |

TABLE 4

| | Product weight | Neutral gear idle 400-6,300 Hz dB(A) rms | |
|---|---|---|---|
| | (g) | Front seat | Back seat |
| Sound absorbing and insulating material (Example 1) | 170 | 31.9 | 31.7 |
| Aluminum heat protector (Comparative Example 1) | 505 | 32.9 | 32.7 |

As can be seen from Table 3 and Table 4, when the highly heat-resistant sound absorbing and insulating material prepared according to the method for manufacturing a highly heat-resistant sound absorbing and insulating material according to the present invention was applied instead of the aluminum heat protector, booming noise was improved by 1.4-2% and the noise inside the vehicle was improved by 1 dB(A).

Test Examples

<Evaluation of Physical Properties of Sound Absorbing and Insulating Material>

The physical properties of the sound absorbing and insulating materials were measured and compared as follows.

1. Evaluation of Heat Resistance

To evaluate heat resistance, the sound absorbing and insulating material was aged in an oven at 260° C. for 300 hours. After keeping at standard state (23±2° C., relative humidity of 50±5%) for at least 1 hour, appearance was inspected and tensile strength was measured. The appearance was visually inspected as to whether there was shrinkage, deformation, surface peeling, fluffing or cracking. The tensile strength was measured for five sheets of randomly selected dumbbell-type No. 1 test specimens at a speed of 200 mm/min under a standard condition.

2. Evaluation of Thermal Cycle

The durability of the sound absorbing and insulating material was evaluated by a thermal cycle test. The durability was determined after performing five cycles.

1) Condition of One Cycle

Room temperature→high temperature (150° C.×3 hr)→room temperature→low temperature (−30° C.×3 hr)→room temperature→humid condition (50° C.×95% RH).

2) Durability Evaluation Standard

After the thermal cycle test, the change in appearance was inspected. For example, surface damage, swelling, breaking and discoloring were inspected. If there was no change in appearance, it was evaluated as 'no abnormality'.

3. Evaluation of Flame Retardancy

The flame retardancy of the sound absorbing and insulating material was measured according to the ISO 3795 flammability test.

4. Evaluation of Nonflammability

The nonflammability of the sound absorbing and insulating material was measured according to the UL94 vertical burn test.

5. Evaluation of Sound-Absorbing Property

The sound-absorbing performance of the sound absorbing and insulating material was measured according ISO354.

6. Evaluation of Air Permeability

1) Evaluation Method

The test specimen was mounted on a Frazier-type tester and the amount of air flowing through the test specimen vertically was measured. The area of the test specimen through which air passed was 5 cm$^2$ and the applied pressure was set to 125 pascal (Pa).

Test Example 1. Comparison of Properties of Sound Absorbing and Insulating Materials Depending on Heat-Resistant Fibers In Test Example 1, the physical properties of sound absorbing and insulating materials prepared with different heat-resistant fiber yarns were compared. The sound absorbing and insulating materials were prepared according to the method of Example 1. For needle punching, yarns having a fineness of 2 denier and a length of 51 mm were used (see Table 5).

The results of measuring the properties of the sound absorbing and insulating materials prepared with different heat-resistant fibers are shown in Table 5 and Table 6.

TABLE 5

| | | Yarn 1 | Yarn 2 | Yarn 3 | Yarn 4 | Yarn 5 | Yarn 6 | Yarn 7 |
|---|---|---|---|---|---|---|---|---|
| Yarn | Yarn material | Aramid | PPS | PI | PBI | PBO | Oxi-PAN | PK |
| | Limiting oxygen index | 40 | 30 | 50 | 40 | 60 | 65 | 30 |
| | Heat resistance temperature (° C. × 1 hr) | 300 | 230 | 300 | 300 | 300 | 300 | 300 |
| Heat resistance | Appearance | No abnormality | No abnormality | No abnormality | No abnormality | No abnormality | No abnormality | No abnormality |
| | Tensile strength (Kgf/cm$^2$) | 200 | 180 | 220 | 200 | 210 | 210 | 200 |
| Thermal cycle | Appearance | No abnormality | No abnormality | No abnormality | No abnormality | No abnormality | No abnormality | No abnormality |

TABLE 5-continued

|  | Yarn 1 | Yarn 2 | Yarn 3 | Yarn 4 | Yarn 5 | Yarn 6 | Yarn 7 |
|---|---|---|---|---|---|---|---|
| Flame retardancy | Self-extinguishing | Self-extinguishing | Self-extinguishing | Self-extinguishing | Self-extinguishing | Self-extinguishing | Self-extinguishing |
| Nonflammability | Nonflammable | Nonflammable | Nonflammable | Nonflammable | Nonflammable | Nonflammable | Nonflammable |

TABLE 6

| | Sound-absorbing rate | | | |
|---|---|---|---|---|
| Frequency (Hz) | Yarn 1 (aramid) | Yarn 2 (PPS) | Yarn 6 (oxi-PAN) | Yarn 7 (PK) |
| 400 | 0.08 | 0.05 | 0.08 | 0.05 |
| 500 | 0.10 | 0.06 | 0.09 | 0.06 |
| 630 | 0.16 | 0.09 | 0.13 | 0.08 |
| 800 | 0.23 | 0.15 | 0.22 | 0.19 |
| 1000 | 0.35 | 0.30 | 0.35 | 0.26 |
| 1250 | 0.44 | 0.39 | 0.45 | 0.37 |
| 1600 | 0.59 | 0.49 | 0.57 | 0.31 |
| 2000 | 0.70 | 0.66 | 0.68 | 0.48 |
| 2500 | 0.79 | 0.71 | 0.80 | 0.67 |
| 3150 | 0.83 | 0.80 | 0.85 | 0.78 |
| 4000 | 0.86 | 0.83 | 0.88 | 0.84 |
| 5000 | 0.99 | 0.95 | 0.92 | 0.83 |
| 6300 | 0.98 | 0.96 | 0.98 | 0.89 |
| 8000 | 0.99 | 0.95 | 0.89 | 0.95 |
| 10000 | 0.98 | 0.97 | 0.99 | 0.95 |

As seen from Table 5 and Table 6, all the sound absorbing and insulating materials prepared according to the present invention using heat-resistant fibers having a limiting oxygen index of 25% or greater and a heat resistance temperature of 150° C. or greater showed satisfactory heat resistance, durability, flame retardancy, nonflammability and sound-absorbing performance. Accordingly, it can be seen that any commonly used heat-resistant fiber may be used for the nonwoven fabric constituting the sound absorbing and insulating material of the present invention.

Test Example 2. Comparison of Properties of Sound Absorbing and Insulating Materials Depending on Density of Nonwoven Fabrics In Test Example 2, the physical properties of the sound absorbing and insulating materials depending on the density of nonwoven fabrics were compared. The sound absorbing and insulating materials were prepared according to the method of Example 1. The density of the nonwoven fabrics was varied in the needle punching step. The sound-absorbing performance of the prepared sound absorbing and insulating materials is shown in FIG. 7.

Figure 7:
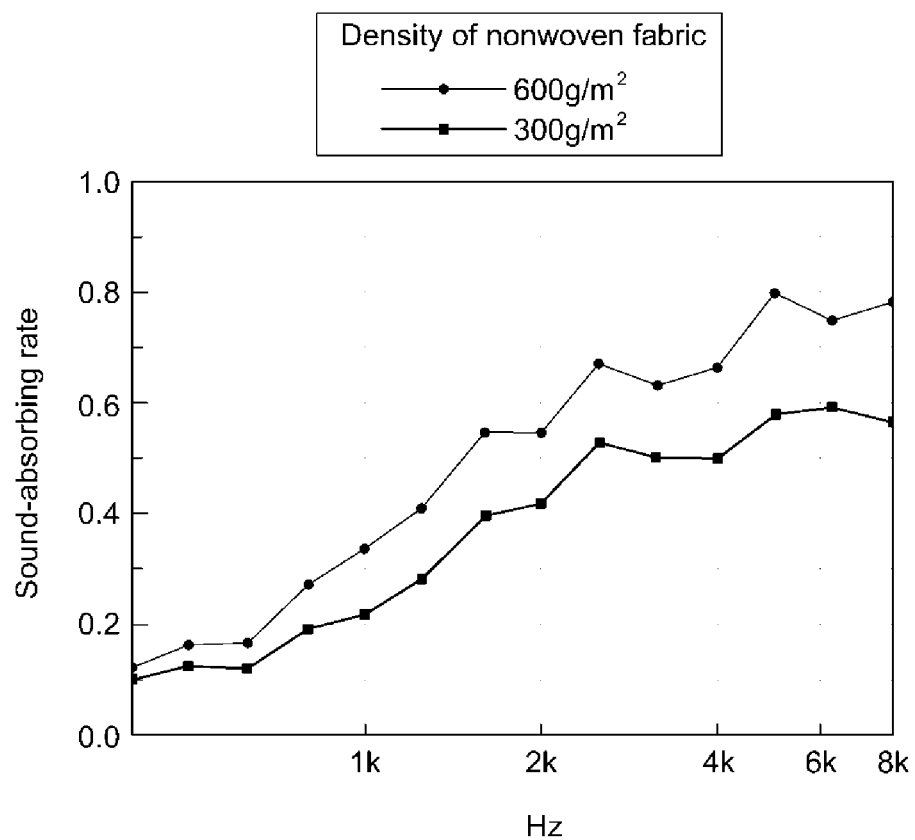
FIG. 7 compares the sound-absorbing performance of a sound absorbing and insulating material depending on the density of a nonwoven fabric.

As seen from FIG. 7, the sound-absorbing performance of the sound absorbing and insulating material was superior when the nonwoven fabric having a density of 600 g/m² was used as compared to when the nonwoven fabric having a density of 300 g/m² was used.

Test Example 3. Evaluation of Physical Properties of Sound Absorbing and Insulating Materials In Test Example 3, the physical properties of the sound absorbing and insulating materials depending on the application type of the thermosetting binder in the nonwoven fabric when preparing the sound absorbing materials were compared.

That is to say, the sound-absorbing rate of the sound absorbing and insulating materials prepared by applying the thermosetting binder to the nonwoven fabric by impregnation (Example 1) or coating (Comparative Example 3) was measured. Table 7 shows the results of measuring the sound-absorbing rate for the sound absorbing and insulating material prepared from a nonwoven fabric (Comparative Example 2), the sound absorbing and insulating material prepared from a thermosetting binder-coated nonwoven fabric (Comparative Example 3) and the sound absorbing and insulating material prepared from a thermosetting binder-impregnated nonwoven fabric (Example 1).

TABLE 7

| | Sound-absorbing rate | | |
|---|---|---|---|
| Frequency (Hz) | Comparative Example 2 (nonwoven fabric) | Comparative Example 3 (binder-coated nonwoven fabric) | Example 1 (binder-impregnated nonwoven fabric) |
| 400 | 0.01 | 0.02 | 0.08 |
| 500 | 0.03 | 0.03 | 0.10 |
| 630 | 0.12 | 0.05 | 0.16 |
| 800 | 0.16 | 0.08 | 0.23 |
| 1000 | 0.26 | 0.12 | 0.35 |
| 1250 | 0.32 | 0.15 | 0.44 |
| 1600 | 0.39 | 0.22 | 0.59 |
| 2000 | 0.48 | 0.29 | 0.70 |
| 2500 | 0.64 | 0.40 | 0.79 |
| 3150 | 0.63 | 0.57 | 0.83 |
| 4000 | 0.72 | 0.68 | 0.86 |
| 5000 | 0.80 | 0.77 | 0.99 |
| 6300 | 0.78 | 0.82 | 0.98 |
| 8000 | 0.89 | 0.98 | 0.99 |
| 10000 | 0.90 | 0.98 | 0.98 |

As seen from Table 7, the sound absorbing and insulating material of Example 1 according to the present invention exhibits superior sound-absorbing rate in all frequency ranges as compared to Comparative Example 2 wherein the nonwoven fabric not impregnated with a thermosetting binder was used as the sound absorbing and insulating material. In contrast, the sound absorbing and insulating material of Comparative Example 3 wherein the thermosetting binder resin-coated nonwoven fabric was used exhibits lower sound-absorbing rate in the frequency range of 400-5000 Hz as compared to Comparative Example 2.

Test Example 4. Evaluation of Heat-Insulating Performance of Sound Absorbing and Insulating Materials In Test Example 4, the heat-insulating performance of the sound absorbing and insulating materials prepared in Example 1 (wherein the thermosetting resin-impregnated aramid nonwoven fabric was used), Comparative Example 2 (wherein the aramid nonwoven fabric was used) and Comparative Example 4 (wherein the thermoplastic resin-impregnated aramid nonwoven fabric was used). After applying heat of 1000° C. from one side of a 25-mm thick sound absorbing and insulating material sample for 5 minutes, temperature was measured on the opposite side of the sample.

The temperature measured on the opposite side of the sound absorbing and insulating material was 250° C. for Example 1 and 350° C. for Comparative Example 2. Accordingly, it can be seen that the sound absorbing and insulating material of the present invention wherein the thermosetting resin is impregnated has improved heat-insulating performance. In contrast, the sound absorbing and insulating material of Comparative Example 4 wherein a thermoplastic resin was impregnated was deformed as the thermoplastic resin was melted as soon as the heat of 1000° C. was applied.

These results show that the sound absorbing and insulating material of the present invention has very superior heat-insulating property.

Test Example 5. Comparison of Heat-Insulating Performance with Aluminum Heat-Insulating Plate In Test Example 5, the heat-insulating performance of the sound absorbing and insulating material of Example 1 was compared with that of an aluminum heat-insulating plate. While applying the same heat from one side of the sound absorbing and insulating material and the heat-insulating plate at 250° C., the temperature at the opposite side was measured with time. The results are shown in FIG. 8.

Figure 8:
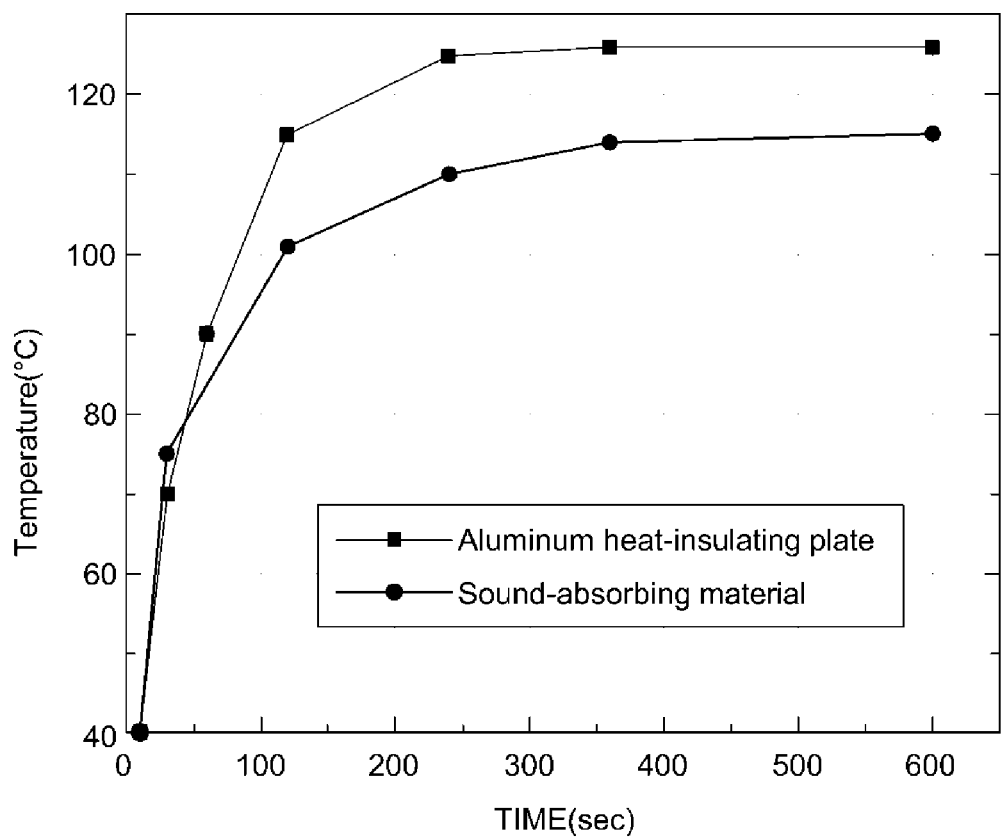
FIG. 8 compares the heat-insulating performance of a highly heat-resistant sound absorbing and insulating material manufactured according to a method for manufacturing a highly heat-resistant sound absorbing and insulating material according to an exemplary embodiment of the present invention with that of an existing aluminum heat-insulating plate.

As seen from FIG. 8, the sound absorbing and insulating material according to the present invention exhibited better heat-insulating performance by 11° C. or greater as compared to the aluminum heat-insulating plate.

Test Example 6. Comparison of Properties of Sound Absorbing and Insulating Materials Depending on Thermosetting Binder Resin Content Sound absorbing and insulating materials were prepared as described in Example 1. The epoxy resin-impregnated aramid nonwoven fabric was dried to have different contents of the binder. The binder content was represented as parts by weight of the binder included in the sound absorbing and insulating material based on 100 parts by weight of the dried nonwoven fabric.

The results of comparing the mechanical properties and sound-absorbing rate of the sound absorbing and insulating materials of prepared with different binder contents are shown in Table 8 and Table 9.

TABLE 8

| | Physical properties of sound absorbing and insulating materials with different binder contents | | | | |
|---|---|---|---|---|---|
| Binder content (parts by weight) | 0 | 10 | 50 | 100 | 200 |
| Air permeability (mL/cm² · s) | 500 | 380 | 350 | 320 | 210 |
| Tensile strength (kg/cm²) | 40 | 60 | 200 | 240 | 310 |
| Flammability | Nonflammable | Nonflammable | Nonflammable | Nonflammable | Nonflammable |

TABLE 9

| | Sound-absorbing rate of sound absorbing and insulating materials with different binder contents | | | | |
|---|---|---|---|---|---|
| Frequency (Hz) | 0 part by weight | 10 parts by weight | 50 parts by weight | 100 parts by weight | 200 parts by weight |
| 400 | 0.01 | 0.01 | 0.08 | 0.06 | 0.02 |
| 500 | 0.03 | 0.04 | 0.10 | 0.09 | 0.04 |
| 630 | 0.12 | 0.14 | 0.16 | 0.15 | 0.09 |
| 800 | 0.16 | 0.17 | 0.23 | 0.25 | 0.11 |
| 1000 | 0.26 | 0.26 | 0.35 | 0.30 | 0.14 |
| 1250 | 0.32 | 0.34 | 0.44 | 0.42 | 0.17 |
| 1600 | 0.39 | 0.41 | 0.59 | 0.54 | 0.22 |
| 2000 | 0.48 | 0.55 | 0.70 | 0.58 | 0.35 |
| 2500 | 0.64 | 0.68 | 0.79 | 0.67 | 0.44 |
| 3150 | 0.63 | 0.69 | 0.83 | 0.72 | 0.52 |
| 4000 | 0.72 | 0.77 | 0.86 | 0.75 | 0.53 |
| 5000 | 0.80 | 0.83 | 0.99 | 0.79 | 0.57 |
| 6300 | 0.78 | 0.88 | 0.98 | 0.80 | 0.63 |
| 8000 | 0.89 | 0.91 | 0.99 | 0.90 | 0.70 |
| 10000 | 0.90 | 0.92 | 0.98 | 0.92 | 0.71 |

From Table 8 and Table 9, it can be seen that the impregnation of the binder in the nonwoven fabric provides improved sound-absorbing rate as compared to the nonwoven fabric wherein the binder is not impregnated. In addition, it can be seen that the sound-absorbing rate of the sound absorbing and insulating material may be controlled with the content of the binder.

Test Example 7. Comparison of Properties of Sound Absorbing and Insulating Materials Depending on Types of Binders Sound absorbing and insulating materials wherein 50 parts by weight of a binder was impregnated based on 100 parts by weight of an aramid nonwoven fabric were prepared according to the method of Example 1. The resins described in Table 10 were used as the binder.

The results of comparing the mechanical properties and sound-absorbing rate of the sound absorbing and insulating materials prepared with different binders are shown in Table 10.

TABLE 10

Sound-absorbing rate of sound absorbing and insulating materials with different binders

| Binder resin | Epoxy | Phenol | Urea | Melamine | Polyurethane |
|---|---|---|---|---|---|
| Heat resistance temperature (° C. × 1 hr) | 300 | 260 | 190 | 300 | 200 |
| Tensile strength (kg/cm²) | 200 | 165 | 180 | 180 | 170 |
| Flame retardancy | Self-extinguishing | Self-extinguishing | Self-extinguishing | Self-extinguishing | Self-extinguishing |
| Flammability | Nonflammable | Nonflammable | Nonflammable | Nonflammable | Nonflammable |

What is claimed is:

1. A method for manufacturing a highly heat-resistant sound absorbing and insulating material, comprising:
   a beating and mixing step of beating and mixing a fiber material comprising a heat-resistant fiber;
   a web forming step of forming a web from the beaten and mixed fiber material;
   a web stacking step of stacking the formed web;
   a needle punching step of forming a nonwoven fabric by moving a needle up and down through the stacked web;
   a binder impregnating step of forming a binder-impregnated nonwoven fabric by immersing the nonwoven fabric in a binder solution wherein a thermosetting binder resin having a heat resistance temperature of 200° C. or greater is dispersed in an organic solvent at a concentration of 5-70 wt %; and
   a solvent recovering step of removing a solvent from the binder-impregnated nonwoven fabric to obtain a nonwoven used as a sound absorbing and insulating material.

2. The method for manufacturing a highly heat-resistant sound absorbing and insulating material according to claim 1, wherein the beating and mixing step comprises beating, mixing or beating and mixing a fiber material having a limiting oxygen index (LOI) of 25% or greater and a heat resistance temperature of 200° C. or greater.

3. The method for manufacturing a highly heat-resistant sound absorbing and insulating material according to claim 2, wherein the fiber material comprises one or more selected from the group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber.

4. The method for manufacturing a highly heat-resistant sound absorbing and insulating material according to claim 3, wherein the fiber material comprises one or more selected from the group consisting of a meta-aramid (m-aramid) fiber and a para-aramid (p-aramid) fiber.

5. The method for manufacturing a highly heat-resistant sound absorbing and insulating material according to claim 1, wherein the beating and mixing step comprises beating a fiber material having 1-10 crimps/cm and having a diameter of 1-33 μm and a length of 20-100 mm or mixing one or more fiber material having 1-10 crimps/cm and having a diameter of 1-33 μm and a length of 20-100 mm.

6. The method for manufacturing a highly heat-resistant sound absorbing and insulating material according to claim 1, wherein the web forming step is performed by carding method.

7. The method for manufacturing a highly heat-resistant sound absorbing and insulating material according to claim 1, wherein the web stacking step is performed at a rate of 10 m/min or lower using a horizontal wrapper.

8. The method for manufacturing a highly heat-resistant sound absorbing and insulating material according to claim 1, wherein the needle punching step is performed by one or more selected from the group consisting of single down needle punching, single up needle punching, double down needle punching and double up needle punching.

9. The method for manufacturing a highly heat-resistant sound absorbing and insulating material according to claim 8, wherein the needle punching step comprises forming a nonwoven fabric with a needle stroke of 30-350 times/m².

10. The method for manufacturing a highly heat-resistant sound absorbing and insulating material according to claim 1, wherein the nonwoven fabric formed in the needle punching step has a single layer thickness of 3-20 mm and a density of 100-2000 g/m².

11. The method for manufacturing a highly heat-resistant sound absorbing and insulating material according to claim 1, wherein the binder impregnating step further comprises compressing the binder-impregnated nonwoven fabric at a pressure of 1-20 kgf/cm² to form a binder-impregnated nonwoven fabric having a density of 1,000-3,000 g/m².

12. The method for manufacturing a highly heat-resistant sound absorbing and insulating material according to claim 1, wherein the binder impregnating step comprises impregnating 20-80 parts by weight of a thermosetting binder resin in 20-80 parts by weight of the nonwoven fabric.

13. The method for manufacturing a highly heat-resistant sound absorbing and insulating material according to claim 1, wherein the binder solution comprises 5-70 wt % of a binder resin, 0.1-10 wt % of a curing agent, 0.01-5 wt % of a catalyst, 1-40 wt % of an additive and a solvent as the balance.

14. The method for manufacturing a highly heat-resistant sound absorbing and insulating material according to claim 13, wherein the binder solution comprises 1-30 wt % of a binder resin, 0.1-10 wt % of a curing agent, 0.01-5 wt % of a catalyst, 1-30 wt % of a flame retardant and 40-95 wt % of a solvent.

15. The method for manufacturing a highly heat-resistant sound absorbing and insulating material according to claim 1, wherein the thermosetting binder resin is an epoxy resin.

16. The method for manufacturing a highly heat-resistant sound absorbing and insulating material according to claim 15, wherein the epoxy resin is one or more selected from bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, bisphenol A diglycidyl ether polymer, phosphazene diglycidyl ether, bisphenol A novolac epoxy, phenol novolac epoxy resin, and o-cresol novolac epoxy resin.

17. The method for manufacturing a highly heat-resistant sound absorbing and insulating material according to claim 1, wherein the solvent recovering step comprises evaporating the solvent by drying in a drying oven at 70-200° C. for 1-10 minutes.

18. The method for manufacturing a highly heat-resistant sound absorbing and insulating material according to claim 17, wherein the nonwoven fabric that has passed through the solvent recovering step comprises 1-300 parts by weight of a binder based on 100 parts by weight of the nonwoven fabric.

19. The method for manufacturing a highly heat-resistant sound absorbing and insulating material according to claim 17, wherein the organic solvent is one or more selected from the group consisting of methyl ethyl ketone (MEK) and dimethyl carbonate (DMC).

20. The method for manufacturing a highly heat-resistant sound absorbing and insulating material according to claim 1, which comprises:
 a beating and mixing step S101 of beating and mixing a fiber material having a limiting oxygen index (LOI) of 25% or greater and a heat resistance temperature of 200° C. or greater;
 a web forming step S103 of forming the fiber material beaten and mixed in the beating and mixing step into a continuous web in the form of a thin sheet;
 a web stacking step S105 of forming a stacked web by overlapping and stacking the web formed in the web forming step with each other;
 a needle punching step S107 of forming a nonwoven fabric by binding the stacked web formed in the web stacking step with each other by moving a needle up and down through the stacked web;
 a binder impregnating step S109 of forming a binder-impregnated nonwoven fabric by immersing the nonwoven fabric formed in the needle punching step in a binder solution wherein a thermosetting binder resin having a heat resistance temperature of 200° C. or greater is dispersed in an organic solvent; and
 a solvent recovering step S111 of forming a thermosetting felt for use as a sound absorbing and insulating material by removing the solvent from the binder-impregnated nonwoven fabric formed in the binder impregnating step such that only the thermosetting binder resin remains.

21. The method for manufacturing a highly heat-resistant sound absorbing and insulating material according to claim 20, which further comprises, after the solvent recovering step S111, a molding step S121 of shaping the dried nonwoven fabric to a sound absorbing and insulating material having a desired shape by molding at 150-300° C.

22. The method for manufacturing a highly heat-resistant sound absorbing and insulating material according to claim 1, wherein the sound absorbing and insulating material has the binder distributed uniformly on the entire fiber yarn of the nonwoven fabric and has smaller-sized vent holes formed as compared to before the impregnation of the binder.

* * * * *